United States Patent
Keller et al.

(10) Patent No.: US 9,971,174 B2
(45) Date of Patent: May 15, 2018

(54) SYSTEM AND METHOD FOR PROVIDING ACTIVE REFRACTION FEEDBACK FOR DEVICES WITH VARIABLE INDEX OF REFRACTION

(71) Applicant: Raytheon Company, Waltham, MA (US)

(72) Inventors: Sean D. Keller, Tucson, AZ (US); Gerald P. Uyeno, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days. days.

(21) Appl. No.: 14/625,237

(22) Filed: Feb. 18, 2015

(65) Prior Publication Data
US 2016/0238524 A1 Aug. 18, 2016

(51) Int. Cl.
*G01N 21/41* (2006.01)
*G02F 1/13* (2006.01)

(52) U.S. Cl.
CPC ................... *G02F 1/1309* (2013.01)

(58) Field of Classification Search
CPC .... G02F 1/00; G02F 2201/00; G02F 2203/00; H01S 5/00; H01S 3/00; G02B 6/00; G02B 27/00
USPC ............................ 356/128; 385/3, 4; 359/333
See application file for complete search history.

(56) References Cited

U.S. PATENT DOCUMENTS

| | | | |
|---|---|---|---|
| 4,861,128 A * | 8/1989 | Ishikawa | G11B 7/1384 346/33 A |
| 4,899,955 A | 2/1990 | Fattal et al. | |
| 5,544,268 A * | 8/1996 | Bischel | G02F 1/011 385/16 |
| 6,167,169 A * | 12/2000 | Brinkman | G02F 1/011 385/10 |
| 6,393,172 B1 * | 5/2002 | Brinkman | G02F 1/03 359/283 |
| 7,034,283 B2 | 4/2006 | Williams et al. | |
| 7,193,771 B1 * | 3/2007 | Smith | H01S 3/042 359/333 |
| 7,315,665 B1 * | 1/2008 | Anderson | G02F 1/0136 349/18 |
| 8,467,044 B2 | 6/2013 | Embry | |
| 2004/0129949 A1 * | 7/2004 | Deliwala | B82Y 20/00 257/194 |
| 2005/0265403 A1 * | 12/2005 | Anderson | H01S 5/143 372/20 |
| 2005/0271325 A1 * | 12/2005 | Anderson | G02F 1/295 385/40 |
| 2008/0008413 A1 * | 1/2008 | Anderson | G02F 1/295 385/8 |
| 2014/0231647 A1 | 8/2014 | Chinn et al. | |

* cited by examiner

*Primary Examiner* — Isiaka Akanbi

(57) ABSTRACT

A system for providing active refraction feedback for devices with a variable index of refraction includes a reference beam generator and an altered reference beam sensor. The reference beam generator is configured to generate a reference beam and to apply the reference beam to a variable-index-of-refraction (VIR) device. The VIR device is configured to generate an altered reference beam based on the reference beam and based on an index of refraction for the VIR device. The altered reference beam sensor is configured to detect the altered reference beam and to sense a characteristic of the altered reference beam corresponding to the index of refraction.

20 Claims, 4 Drawing Sheets ated reference beam sensor. The reference beam generator is configured to generate a reference beam and to apply the reference beam to a variable-index-of-refraction (VIR) device. The VIR device is configured to generate an altered reference beam based on the reference beam and based on an index of refraction for the VIR device. The altered reference beam sensor is configured to detect the altered reference beam and to sense a characteristic of the altered reference beam corresponding to the index of refraction.

SYSTEM AND METHOD FOR PROVIDING ACTIVE REFRACTION FEEDBACK FOR DEVICES WITH VARIABLE INDEX OF REFRACTION

TECHNICAL FIELD

The present disclosure is directed, in general, to active optical devices and, more specifically, to a system and method for providing active refraction feedback for devices with a variable index of refraction.

BACKGROUND

Traditionally, applications in which steering is provided for laser beams have included mechanical structures, such as gimbals, for steering the laser beams. However, gimbals can be heavy, difficult to manufacture and expensive. As a result, active optical devices are sometimes implemented to provide steering without moving parts. For example, a liquid crystal waveguide manufactured by VESCENT PHOTONICS steers laser beams by applying a varying voltage to a liquid crystal material that is subject to the electro-optic effect. However, temperature variations, voltage jitter and other error sources may prevent a laser beam from being steered to a desired angle.

SUMMARY

This disclosure provides a system and method for providing active refraction feedback for devices with a variable index of refraction.

In one embodiment, a system includes a reference beam generator and an altered reference beam sensor. The reference beam generator is configured to generate a reference beam and to apply the reference beam to a variable-index-of-refraction (VIR) device. The VIR device is configured to generate an altered reference beam based on the reference beam and based on an index of refraction for the VIR device. The altered reference beam sensor is configured to detect the altered reference beam and to sense a characteristic of the altered reference beam corresponding to the index of refraction.

In another embodiment, a system includes a reference beam generator, an altered reference beam generator and a voltage adjuster. The reference beam generator is configured to generate a reference beam and to apply the reference beam to a VIR device. The VIR device is configured to generate an altered reference beam based on the reference beam and to steer an input beam of light to generate a steered beam at a steered angle. The altered reference beam sensor is configured to detect the altered reference beam and to sense a characteristic of the altered reference beam related to an actual index of refraction corresponding to the steered angle. The voltage adjuster is configured to determine the actual index of refraction based on the sensed characteristic.

In yet another embodiment, a method includes applying a reference beam to a VIR device. The VIR device is configured to generate an altered reference beam based on the reference beam and based on an actual index of refraction for the VIR device. The altered reference beam is detected. A characteristic of the altered reference beam that corresponds to the actual index of refraction is sensed.

Other technical features may be readily apparent to one skilled in the art from the following figures, descriptions, and claims.

BRIEF DESCRIPTION OF THE DRAWINGS

For a more complete understanding of the present disclosure, reference is now made to the following description taken in conjunction with the accompanying drawings, in which.

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented using any number of techniques, whether currently known or not. Additionally, the drawings are not necessarily drawn to scale.

Figure 1:
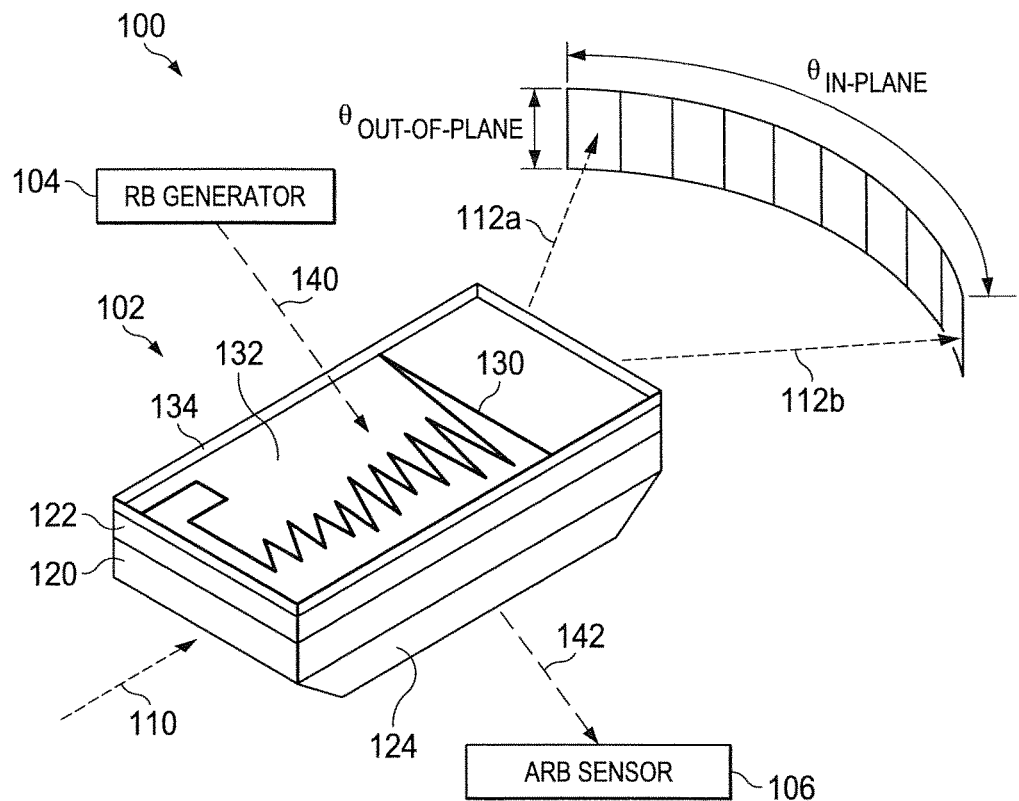
FIG. 1 illustrates a portion of a system for providing active refraction feedback for devices with a variable index of refraction in accordance with an embodiment of the present disclosure.

FIG. 1 illustrates a portion of a system 100 for providing active refraction feedback for devices with a variable index of refraction in accordance with an embodiment of the present disclosure. The embodiment of the system 100 shown in FIG. 1 is for illustration only. Other embodiments of the system 100 could be used without departing from the scope of this disclosure.

The illustrated system 100 includes a liquid crystal waveguide (LCWG) 102, a reference beam (RB) generator 104 and an altered reference beam (ARB) sensor 106. However, it will be understood that the LCWG 102 may represent any suitable variable-index-of-refraction device (i.e., a device that provides active control over light, such as steering, focusing or the like, by varying an index of refraction of a material in the device). The LCWG 102 is configured to receive an input beam of light 110 and to output a steered beam of light 112 (e.g., steered beam $112_a$ or steered beam $112_b$). The LCWG 102 is configured to steer light, such as a laser beam, through a varying voltage applied to a liquid crystal material in the LCWG 102 that is subject to the electro-optic effect. That is, a voltage applied to the LCWG 102 can change the index of refraction of the liquid crystal material, causing a beam of light to be refracted at a different angle.

Thus, the LCWG 102 is configured to adjust the direction of the steered beam 112 based on a voltage applied to the LCWG 102. For example, if a first voltage is applied, the LCWG 102 may output a steered beam $112_a$ in a first direction, while if a second voltage is applied, the LCWG 102 may output a steered beam $112_b$ in a second direction.

The steered beam 112 may be steered both in an in-plane direction and in an out-of-plane direction, as shown in FIG. 1.

For some embodiments, the LCWG 102 may be configured similar to the waveguide disclosed in U.S. Pat. No. 8,860,897. For example, the LCWG 102 may include a core 120, an upper cladding 122, and a lower cladding 124. The core 120 is configured to receive the input beam 110 and to confine the beam 110 as it traverses the LCWG 102. The upper cladding 122 includes a liquid crystal material and may include a first electrode 130, a second electrode 132 and a third electrode 134 on its upper surface. For this embodiment, the LCWG 102 may apply an in-plane voltage to the first electrode 130 (or the second electrode 132) to steer the input beam 110 left (or right) along a plane parallel to the upper cladding 122. Similarly, the LCWG 102 may apply an out-of-plane voltage to the third electrode 134 to steer the beam 110 up or down with reference to the plane parallel to the upper cladding 122. The lower cladding 124 may include silicon or other suitable material that is transparent to light. The lower cladding 124 may also be conductive so as to act as a ground plate for the electrodes 130, 132 and 134.

When a voltage is applied to one or more of the electrodes 130, 132 and 134 and the lower cladding 124 is used as a ground plate, an electric field is established through the core 120 and claddings 122 and 124 that changes the index of refraction of the liquid crystal material in the upper cladding 122. The shape of the index change under each electrode 130, 132 and 134 corresponds to the shape of that electrode 130, 132 and 134. The same change in the index of refraction also exists in the core 120 such that a beam 110 traveling through the core 120 experiences the same index change, which results in the beam 110 being steered in accordance with the applied voltage.

The reference beam generator 104 and the ARB sensor 106 are configured to calibrate the LCWG 102 in order to minimize errors resulting from temperature variations, voltage jitter, or other error sources that may otherwise prevent the LCWG 102 from accurately steering a beam of light at a desired angle. Thus, the reference beam generator 104 is configured to generate a reference beam 140 and apply the reference beam 140 to the upper cladding 122. The reference beam 140 is allowed to pass through the upper cladding 122, the core 120 and the lower cladding 124, in addition to one of the electrodes 130, 132 or 134, as each of these components 120, 122, 124 and 130, 132 or 134 is transparent to light. For some embodiments, the reference beam generator 104 may be configured to apply the reference beam 140 to the LCWG 102 at a particular angle that results in the length of the reference beam's 140 path through the LCWG 102 being maximized or reaching a desired distance. For other embodiments, the reference beam 140 may be normal to the LCWG 102.

As the reference beam 140 passes through the LCWG 102, the LCWG 102 is configured to alter the reference beam 140 based on a voltage applied to one of the electrodes 130, 132 and 134 and to output an altered reference beam 142. The reference beam 140 is altered in accordance with the change in the index of refraction associated with the voltage applied to the electrode 130, 132 or 134 through which the reference beam 140 passes. The ARB sensor 106 is configured to detect the altered reference beam 142 and to sense a characteristic of the altered reference beam 142 that may be used in determining the index of refraction and, thus, an angle of steering of the input beam 110 for the electrode 130, 132 or 134 through which the reference beam 140 passed.

For example, for the illustrated embodiment, the reference beam generator 104 may be configured to apply the reference beam 140 to an area of the first electrode 130, while the LCWG 102 is configured to alter the reference beam 140 based on a voltage applied to the first electrode 130. In this case, the ARB sensor 106 is configured to sense a characteristic of the altered reference beam 142 that may be used in determining an angle of left in-plane steering for the steered beam 112b. (For example, as described in more detail below, the ARB sensor 106 may be configured to sense a position or intensity of the altered reference beam 142.) Similarly, the reference beam 140 may be applied to an area of the second electrode 132 to determine an angle of right in-plane steering for the steered beam 112a, and the reference beam 140 may be applied to an area of the third electrode 134 to determine an angle of out-of-plane steering for the steered beam 112.

In this way, a direct measurement of the index of refraction may be achieved without requiring interrogation of the beam, which can add alignment uncertainty and reduce optical throughput. This measurement may be useful for steering, focusing or other applications involving active optical devices with variable indices of refraction.

Although FIG. 1 illustrates one example of a portion of a system 100 for providing active refraction feedback for devices with a variable index of refraction, various changes may be made to the embodiment shown in FIG. 1. For example, the makeup and arrangement of the system 100 are for illustration only. Components could be added, omitted, combined, subdivided, or placed in any other suitable configuration according to particular needs.

In the following figures, a steering application of the system 100 is described. However, it will be understood that the system 100 may be implemented in any other suitable application, such as focusing or other processing of laser beams.

Figure 2:
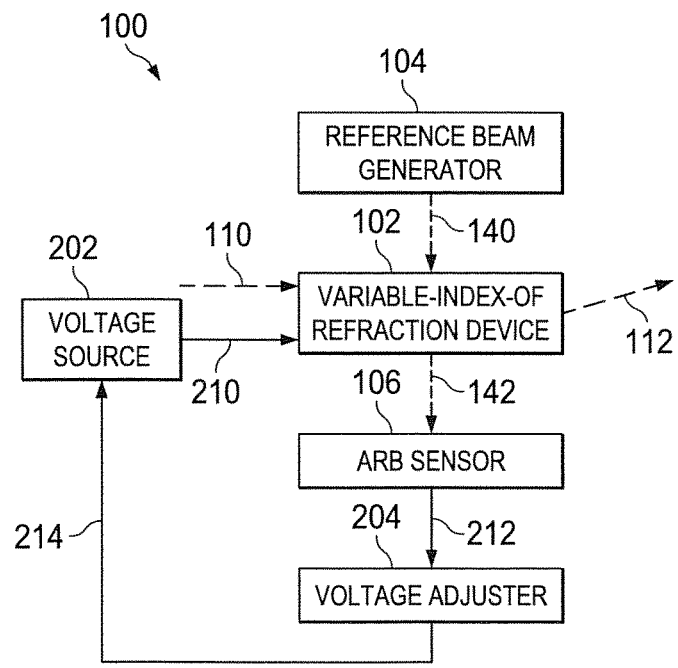
FIG. 2 illustrates a system for providing active refraction feedback for devices with a variable index of refraction in accordance with an embodiment of the present disclosure.

FIG. 2 illustrates the system 100 in accordance with an embodiment of the present disclosure. The embodiment of the system 100 shown in FIG. 2 is for illustration only. Other embodiments of the system 100 could be used without departing from the scope of this disclosure.

For this embodiment, in addition to a variable-index-of-refraction (VIR) device 102 (such as an LCWG), the reference beam generator 104 and the ARB sensor 106, the system 100 includes a voltage source 202 and a voltage adjuster 204. The voltage source 202 is configured to apply one or more voltages 210 to one or more electrodes 130, 132 and 134 (not shown in FIG. 2) of the VIR device 102 to achieve a desired index of refraction in the VIR device 102 and, thus, a desired steered angle for the steered beam 112. As described above, the reference beam generator 104 is configured to generate a reference beam 140 that travels through the VIR device 102, where the beam 140 is altered in accordance with the index of refraction and output from the VIR device 102 as an altered reference beam 142.

The ARB sensor 106 is configured to detect the altered reference beam 142 and to sense a characteristic of the altered reference beam 142 that may be used in determining the index of refraction and, thus, the actual steered angle of the steered beam 112. The ARB sensor 106 is also configured to provide sensor data 212 to the voltage adjuster 204. The sensor data 212 includes the sensed characteristic of the altered reference beam 142. The voltage adjuster 204 is configured to determine an actual index of refraction, which corresponds to an actual steered angle of the steered beam 112, based on the sensor data 212. The actual index of refraction may be different from the desired index of refraction, which is used to determine the initial amount of voltage 210 to be applied by the voltage source 202.

The voltage adjuster 204 is also configured to generate a voltage adjustment 214 based on a difference between the actual index of refraction and the desired index of refraction. For some embodiments, the voltage adjuster 204 may generate a voltage adjustment 214 that includes an updated voltage 210 to apply to the VIR device 102. For other embodiments, the voltage adjustment 214 includes a change to a current voltage 210 applied to the waveguide. The voltage source 202 is configured to receive the voltage adjustment 214 and to adjust the amount of the applied voltage 210 based on the voltage adjustment 214 such that the actual steered angle of the steered beam 112 is the desired angle.

For some embodiments, as described in more detail below in connection with FIGS. 3A-3B, the ARB sensor 106 may be configured to sense a position of the altered reference beam 142. For some other embodiments, as described in more detail below in connection with FIGS. 4A-4B, the ARB sensor 106 may be configured to sense an intensity of the altered reference beam 142. It will be understood that the ARB sensor 106 may be configured to sense any suitable characteristic of the altered reference beam 142 that relates to a determination of the index of refraction experienced by the reference beam 140 while passing through the VIR device 102.

Although FIG. 2 illustrates one example of a system 100 for providing active refraction feedback for devices with a variable index of refraction, various changes may be made to the embodiment shown in FIG. 2. For example, the makeup and arrangement of the system 100 are for illustration only. Components could be added, omitted, combined, subdivided, or placed in any other suitable configuration according to particular needs.

Figure 3A:
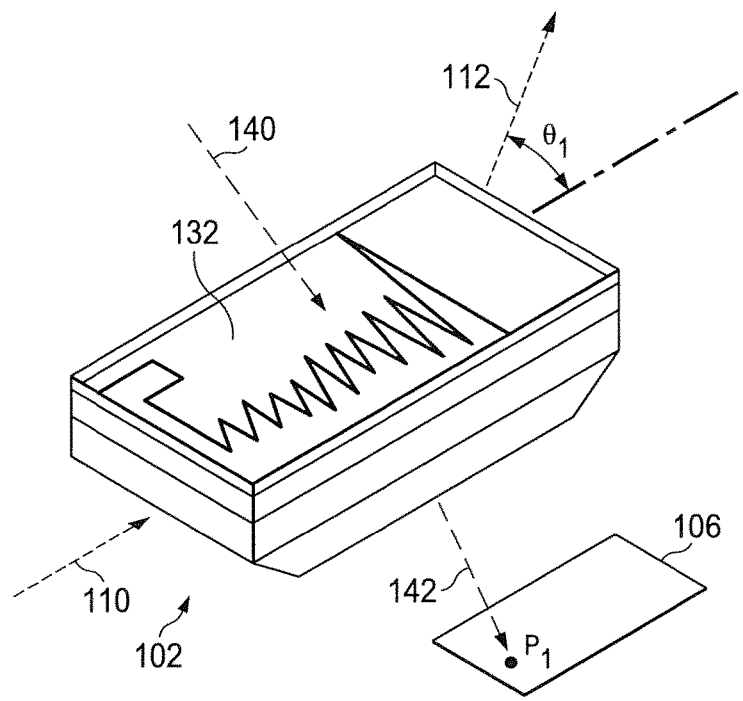
FIGS. 3A and 3B illustrate operation of the system of FIG. 1 or 2 in accordance with an embodiment of the present disclosure.
Figure 3B:
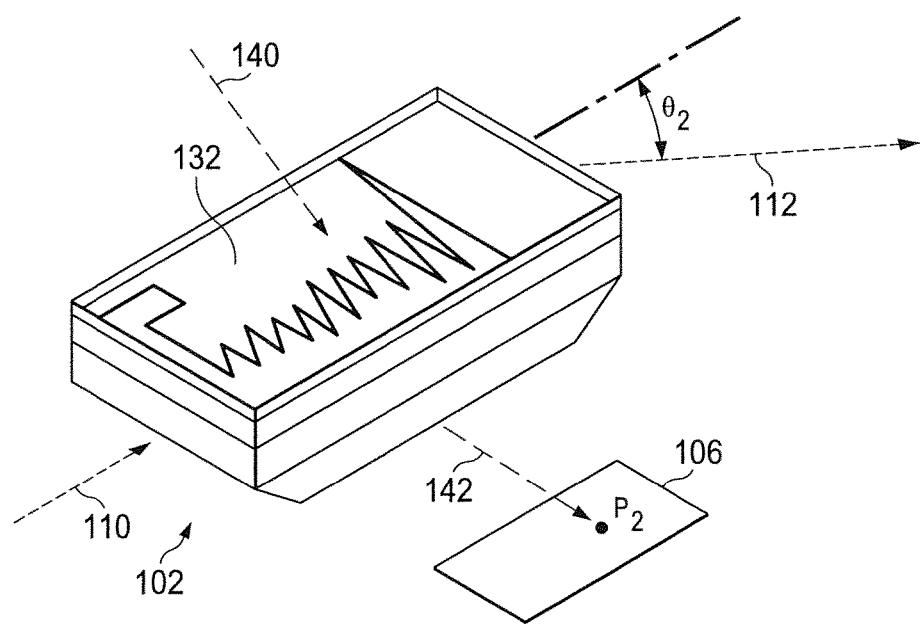

FIGS. 3A and 3B illustrate operation of the system 100 in accordance with an embodiment of the present disclosure. The embodiment of the system 100 shown in FIGS. 3A and 3B is for illustration only. Other embodiments of the system 100 could be used without departing from the scope of this disclosure.

For this embodiment, the ARB sensor 106 includes a position sensing detector. Thus, as shown in FIG. 3A, when a first voltage (or no voltage) is applied to the second electrode 132, the altered reference beam 142 strikes the position sensing detector at a position $P_1$. However, when a different voltage is applied to the second electrode 132, the altered reference beam 142 strikes the position sensing detector at a different position $P_2$. Therefore, the sensor data 212 for this embodiment includes position data.

The voltage adjuster 204 (not shown in FIG. 3A or 3B) in this embodiment is configured to determine an actual index of refraction, which corresponds to an actual steered angle of the steered beam 112, based on the position data. Thus, for example, a particular index of refraction $n_1$ may correspond to position $P_1$, while a different particular index of refraction $n_2$ may correspond to position $P_2$. In addition, $n_1$ corresponds to a particular steered angle $\theta_1$, while $n_2$ corresponds to a different particular steered angle $\theta_2$. Thus, by knowing the position of the altered reference beam 142, the voltage adjuster 204 can determine the corresponding index of refraction and, thus, how far and in which direction the actual steered angle is offset from the desired steered angle.

Figure 4A:
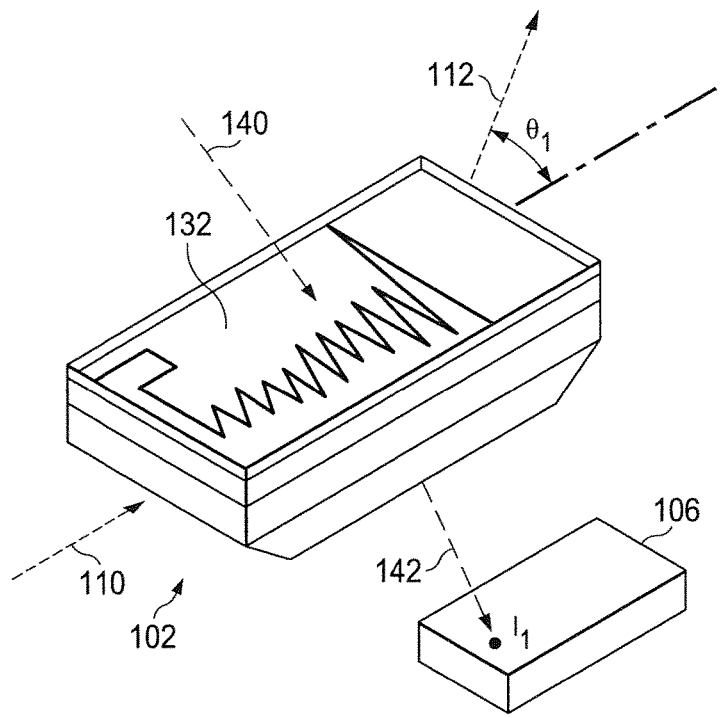
FIGS. 4A and 4B illustrate operation of the system of FIG. 1 or 2 in accordance with another embodiment of the present disclosure.
Figure 4B:
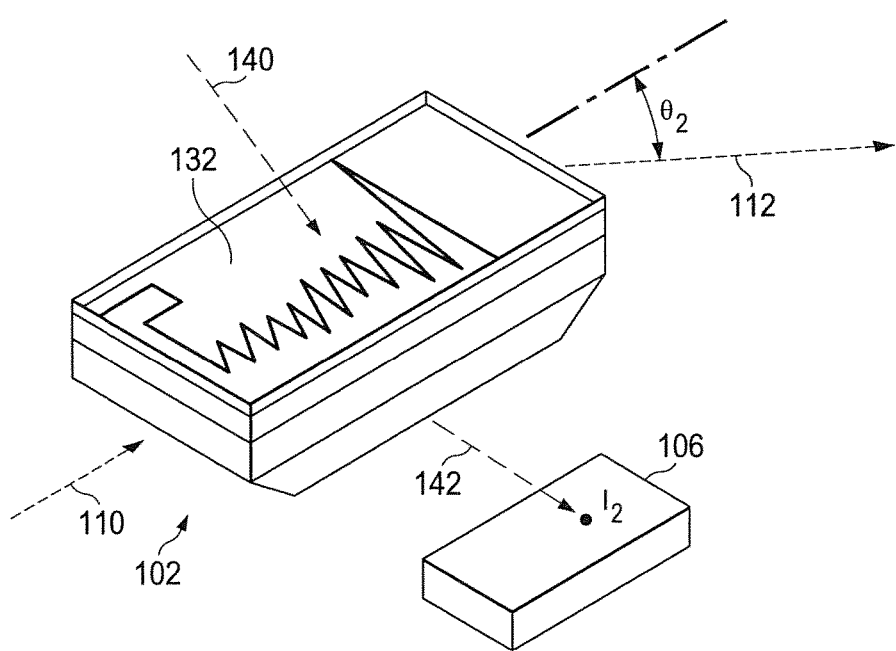

FIGS. 4A and 4B illustrate operation of the system 100 in accordance with another embodiment of the present disclosure. The embodiment of the system 100 shown in FIGS. 4A and 4B is for illustration only. Other embodiments of the system 100 could be used without departing from the scope of this disclosure.

For this embodiment, the system 100 includes a polarizer 150 (e.g., a half-wave plate) that is configured to polarize the reference beam 140 parallel to an axis of the VIR device 102 such that the reference beam 140 passes through the VIR device 102 at different intensities based on different applied voltages 210, and the ARB sensor 106 includes an intensity sensing detector. Thus, as shown in FIG. 4A, when a first voltage is applied to the second electrode 132, the altered reference beam 142 strikes the intensity sensing detector with an intensity $I_1$. However, when a different voltage is applied to the second electrode 132, the altered reference beam 142 strikes the intensity sensing detector with a different intensity $I_2$. Therefore, the sensor data 212 for this embodiment includes intensity data.

The voltage adjuster 204 (not shown in FIG. 4A or 4B) in this embodiment is configured to determine an actual index of refraction, which corresponds to an actual steered angle of the steered beam 112, based on the intensity data. Thus, for example, a particular index of refraction $n_1$ may correspond to intensity $I_1$, while a different particular index of refraction $n_2$ may correspond to intensity $I_2$. In addition, $n_1$ corresponds to a particular steered angle $\theta_1$, while $n_2$ corresponds to a different particular steered angle $\theta_2$. Thus, by knowing the intensity of the altered reference beam 142, the voltage adjuster 204 can determine the corresponding index of refraction and, thus, how far and in which direction the actual steered angle is offset from the desired steered angle.

Figure 5:
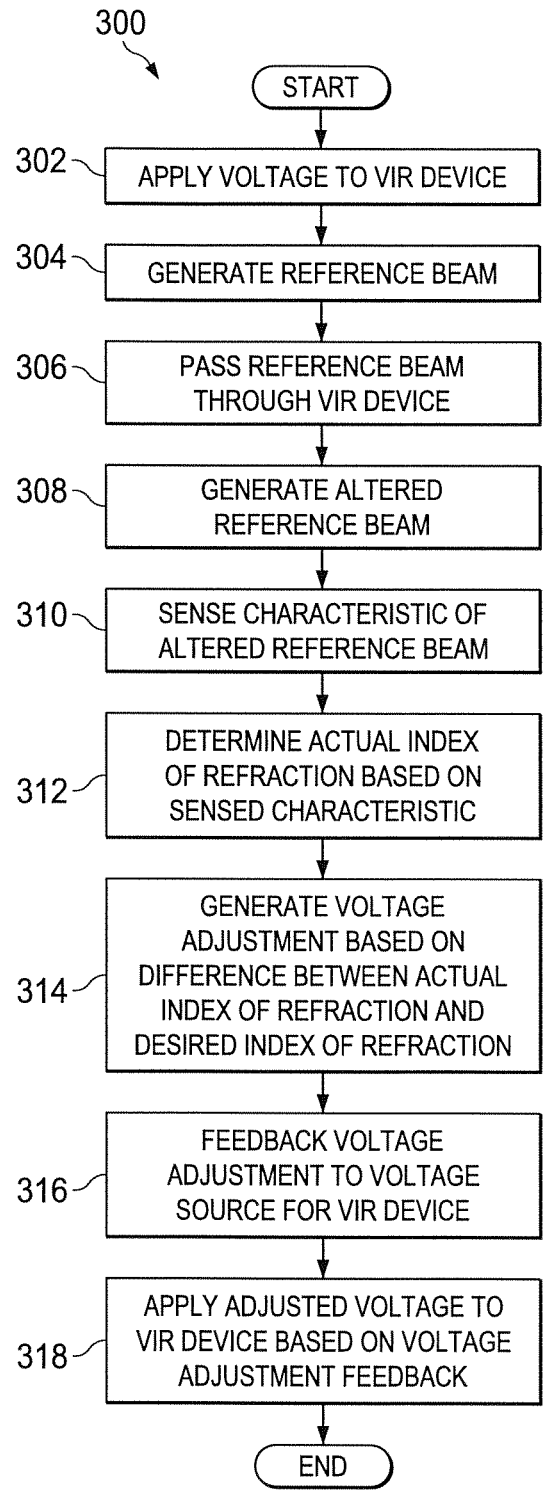
FIG. 5 is a flowchart illustrating a method for providing active refraction feedback for devices with a variable index of refraction in accordance with an embodiment of the present disclosure.

FIG. 5 is a flowchart illustrating a method 300 for providing active refraction feedback for devices with a variable index of refraction in accordance with an embodiment of the present disclosure. The method 300 shown in FIG. 5 is for illustration only. Active refraction feedback may be provided in any other suitable manner without departing from the scope of this disclosure.

Initially, a voltage source 202 applies a voltage 210 to a VIR device 102, such as an LCWG (step 302). A reference beam 140 is generated (step 304). As a particular example, in some embodiments, the reference beam generator 104 generates the reference beam 140. The reference beam 140 is passed through the VIR device 102 (step 306). The VIR device 102 generates an altered reference beam 142 based on the reference beam 140 passing through the VIR device 102 with a particular index of refraction corresponding to the applied voltage 210 (step 308).

A characteristic of the altered reference beam 142 is sensed (step 310). As a particular example, in some embodiments, an ARB sensor 106 senses a position or an intensity of the altered reference beam 142. An actual index of refraction for the VIR device 102 is determined based on the sensed characteristic (step 312). As a particular example, in some embodiments, a voltage adjuster 204 may determine the actual index of refraction based on the position or based on the intensity of the altered reference beam 142.

A voltage adjustment 214 is generated based on a difference between the actual index of refraction and a desired index of refraction, which corresponds to a desired steered angle for a steered beam 112 output by the VIR device 102 (step 314). As a particular example, in some embodiments, the voltage adjuster 204 generates the voltage adjustment 214, which may include a new value for the voltage 210 or a change to the current voltage 210. The voltage adjustment 214 is fed back to the voltage source 202 for the VIR device 102 (step 316). As a particular example, in some embodiments, the voltage adjuster 204 feeds back the voltage adjustment 214 to the voltage source 202. The voltage source 202 applies an adjusted voltage 210 to the VIR device 102 based on the voltage adjustment 214 feedback (step 318).

Although FIG. 5 illustrates one example of a method 300 for providing active refraction feedback for devices with a variable index of refraction, various changes may be made to the embodiment shown in FIG. 5. For example, while shown as a series of steps, various steps in FIG. 5 could overlap, occur in parallel, occur in a different order, or occur multiple times. In addition, for a particular example, in some embodiments, the method 300 may be performed for each electrode 130, 132 and 134 of the LCWG 102 to determine an adjusted voltage 210 for the left in-plane direction, the right in-plane direction and the out-of-plane direction, respectively. In addition, the method 300 may be repeated to continually adjust for temperature changes, voltage jitter changes or other varying sources of error.

Modifications, additions, or omissions may be made to the apparatuses and methods described here without departing from the scope of the disclosure. For example, the components of the apparatuses may be integrated or separated. The methods may include more, fewer, or other steps. Additionally, as described above, steps may be performed in any suitable order.

It may be advantageous to set forth definitions of certain words and phrases used throughout this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The term "each" refers to each member of a set or each member of a subset of a set. Terms such as "over" and "under" may refer to relative positions in the figures and do not denote required orientations during manufacturing or use. Terms such as "higher" and "lower" denote relative values and are not meant to imply specific values or ranges of values. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system, comprising:
 a reference beam generator configured to generate a reference beam and to apply the reference beam to a variable-index-of-refraction (VIR) device, wherein the VIR device is configured to receive an input beam and output a steered beam, the input beam generated by a source that is different from the reference beam generator, the VIR device further configured to generate and output an altered reference beam that is different from the output steered beam, the altered reference beam based on the reference beam and based on an index of refraction for the VIR device;
 an altered reference beam sensor configured to detect the altered reference beam and to sense a characteristic of the altered reference beam corresponding to the index of refraction; and
 a voltage adjuster configured to (i) determine the index of refraction based on the characteristic of the altered reference beam, and (ii) generate a voltage adjustment based on the index of refraction.

2. The system of claim 1, wherein the characteristic of the altered reference beam comprises a position.

3. The system of claim 1, wherein the characteristic of the altered reference beam comprises an intensity.

4. The system of claim 1, wherein the voltage adjuster is configured to receive the characteristic of the altered reference beam from the altered reference beam sensor.

5. A system, comprising:
 a reference beam generator configured to generate a reference beam and to apply the reference beam to a variable-index-of-refraction (VIR) device, wherein the VIR device is configured to generate and output an altered reference beam based on the reference beam, the VIR device further configured to receive and steer an input beam of light to generate and output a steered beam at a steered angle, the output steered beam different from the output altered reference beam, the input beam generated by a source that is different from the reference beam generator;
 an altered reference beam sensor configured to detect the altered reference beam and to sense a characteristic of the altered reference beam related to an actual index of refraction corresponding to the steered angle; and
 a voltage adjuster configured to (i) determine the actual index of refraction based on the sensed characteristic, and (ii) generate a voltage adjustment based on the actual index of refraction.

6. The system of claim 5, further comprising a voltage source configured to apply a voltage to the VIR device, wherein the voltage adjuster is further configured to feed back the voltage adjustment to the voltage source, and wherein the voltage source is further configured to adjust the voltage applied to the VIR device based on the voltage adjustment.

7. The system of claim 5, wherein the voltage adjustment includes an updated voltage to apply to the VIR device.

8. The system of claim 5, wherein the voltage adjustment includes a change to a current voltage applied to the VIR device.

9. The system of claim 5, wherein the voltage adjuster is further configured to generate the voltage adjustment based on a difference between the actual index of refraction and a desired index of refraction.

10. The system of claim 5, wherein the characteristic of the altered reference beam comprises a position.

11. The system of claim 5, wherein the characteristic of the altered reference beam comprises an intensity.

12. The system of claim 5, wherein the voltage adjuster is configured to receive the sensed characteristic from the altered reference beam sensor.

13. A method, comprising:
 applying a reference beam to a variable-index-of-refraction (VIR) device, wherein the VIR device is configured to receive an input beam and output a steered beam, the input beam generated by a source that is different from a source that generates the reference beam, the VIR device further configured to generate and output an altered reference beam that is different from the output steered beam, the altered reference beam based on the reference beam and based on an actual index of refraction for the VIR device;

detecting the altered reference beam;

sensing a characteristic of the altered reference beam corresponding to the actual index of refraction;

determining the actual index of refraction based on the sensed characteristic; and generating a voltage adjustment based on the actual index of refraction.

14. The method of claim 13, wherein the VIR device is further configured to generate the steered beam at a steered angle, and wherein the actual index of refraction corresponds to the steered angle.

15. The method of claim 13, further comprising:

applying a voltage to the VIR device;

feeding back the voltage adjustment; and adjusting the voltage applied to the VIR device based on the voltage adjustment.

16. The method of claim 15, wherein the voltage adjustment comprises an updated voltage to apply to the VIR device.

17. The method of claim 15, wherein the voltage adjustment comprises a change to a current voltage applied to the VIR device.

18. The method of claim 13, wherein the characteristic of the altered reference beam comprises a position.

19. The method of claim 13, wherein the characteristic of the altered reference beam comprises an intensity.

20. The method of claim 13, wherein the determining of the actual index of refraction is performed by a voltage adjuster that receives the sensed characteristic from an altered reference beam sensor.

* * * * *